(12) United States Patent
Tsuji et al.

(10) Patent No.: US 11,183,740 B2
(45) Date of Patent: Nov. 23, 2021

(54) ROLLED-TYPE BATTERY

(71) Applicant: PANASONIC INTELLECTUAL PROPERTY MANAGEMENT CO., LTD., Osaka (JP)

(72) Inventors: Tomoki Tsuji, Osaka (JP); Akira Kakinuma, Osaka (JP); Tetsuya Hayashi, Osaka (JP); Keisuke Yoneda, Osaka (JP)

(73) Assignee: PANASONIC INTELLECTUAL PROPERTY MANAGEMENT CO., Osaka (JP)

( * ) Notice: Subject to any disclaimer, the term of this patent is extended or adjusted under 35 U.S.C. 154(b) by 160 days.

(21) Appl. No.: 16/527,842

(22) Filed: Jul. 31, 2019

(65) Prior Publication Data

US 2019/0355958 A1 Nov. 21, 2019

Related U.S. Application Data

(63) Continuation of application No. 15/306,626, filed as application No. PCT/JP2015/002557 on May 21, 2015, now Pat. No. 10,411,243.

(30) Foreign Application Priority Data

Jun. 26, 2014 (JP) ................................. 2014-131555

(51) Int. Cl.
*H01M 10/0525* (2010.01)
*H01M 50/538* (2021.01)
(Continued)

(52) U.S. Cl.
CPC ........... *H01M 50/538* (2021.01); *H01M 4/04* (2013.01); *H01M 6/14* (2013.01); *H01M 10/04* (2013.01);
(Continued)

(58) Field of Classification Search
CPC ............. H01M 10/04; H01M 10/0431; H01M 10/052; H01M 10/0525; H01M 10/0587;
(Continued)

(56) References Cited

U.S. PATENT DOCUMENTS

| 5,591,522 A | 1/1997 | Sakai et al. | |
|---|---|---|---|
| 2004/0161662 A1* | 8/2004 | Kim | H01M 10/0587 |
| | | | 429/94 |

(Continued)

FOREIGN PATENT DOCUMENTS

| CN | 101615694 A | 12/2009 |
|---|---|---|
| JP | 05-074423 A | 3/1993 |

(Continued)

OTHER PUBLICATIONS

Machine Translation JP2004146222A (Year: 2004).*

(Continued)

*Primary Examiner* — Victoria H Lynch
(74) *Attorney, Agent, or Firm* — Westerman, Hattori, Daniels & Adrian, LLP

(57) ABSTRACT

A wound battery includes an electrode assembly in which a first electrode and a second electrode are wound together via a separator, the electrode assembly being accommodated in a battery case including a bottomed tube-shaped metallic can. The first electrode has a first uncoated region defined by an exposed portion of a first current collector sheet at an end of the first current collector sheet in the axial direction of winding. The first electrode includes a first current collector lead connected to the first uncoated region. The first uncoated region is disposed on the same side as the open end of the metallic can. The second electrode includes a second current collector lead connected thereto. The first and the second current collector leads extend toward the open end of the metallic can. At least a portion of the first uncoated (Continued)

region is covered with an insulating layer, and the insulating layer extends beyond an end face of the first uncoated region.

15 Claims, 5 Drawing Sheets

(51) Int. Cl.
*H01M 10/0587* (2010.01)
*H01M 4/04* (2006.01)
*H01M 10/04* (2006.01)
*H01M 50/10* (2021.01)
*H01M 50/107* (2021.01)
*H01M 50/531* (2021.01)
*H01M 50/572* (2021.01)
*H01M 6/14* (2006.01)
*H01M 4/13* (2010.01)

(52) U.S. Cl.
CPC ... *H01M 10/0431* (2013.01); *H01M 10/0525* (2013.01); *H01M 10/0587* (2013.01); *H01M 50/10* (2021.01); *H01M 50/107* (2021.01); *H01M 50/531* (2021.01); *H01M 50/572* (2021.01); *H01M 4/13* (2013.01)

(58) Field of Classification Search
CPC .......... H01M 4/04; H01M 4/13; H01M 50/10; H01M 50/107; H01M 50/116; H01M 50/531; H01M 50/538; H01M 50/56; H01M 50/572; H01M 6/14; Y02E 60/10
See application file for complete search history.

(56) References Cited

U.S. PATENT DOCUMENTS

| 2005/0175892 | A1 | 8/2005 | Mizutani |
| 2005/0277022 | A1 | 12/2005 | Kozuki |
| 2006/0269835 | A1 | 11/2006 | Song |
| 2008/0280197 | A1 | 11/2008 | Machida |
| 2010/0035144 | A1 | 2/2010 | Oh et al. |
| 2011/0217576 | A1 | 9/2011 | Ueda et al. |
| 2011/0274953 | A1 | 11/2011 | Hato et al. |
| 2013/0045405 | A1* | 2/2013 | Ahn .................... H01M 50/463 429/94 |
| 2013/0316209 | A1 | 11/2013 | Masumoto et al. |
| 2015/0125738 | A1 | 5/2015 | Hirose |
| 2015/0303485 | A1* | 10/2015 | Kim ....................... H01M 4/64 429/94 |

FOREIGN PATENT DOCUMENTS

| JP | H08-7877 A | 1/1996 | |
| JP | 2000-77078 A | 3/2000 | |
| JP | 2004146222 A | * 5/2004 | ............ H01M 10/05 |
| JP | 2004241170 A | * 8/2004 | ............ H01M 10/05 |
| JP | 2005-222887 A | 8/2005 | |
| JP | 2005-243526 A | 9/2005 | |
| JP | 2010-073653 A | 4/2008 | |
| JP | 2009-199960 A | 9/2009 | |
| JP | 2010-3697 A | 1/2010 | |
| JP | 2011-238375 A | 11/2011 | |
| JP | 2013-206755 A | 10/2013 | |
| JP | 2013-211123 A | 10/2013 | |
| JP | 2013-232374 A | 11/2013 | |
| JP | 2013-251108 A | 12/2013 | |
| WO | 2012/111061 A1 | 8/2012 | |
| WO | 2013/038701 A1 | 3/2013 | |

OTHER PUBLICATIONS

Machine Translation JP2004241170A (Year: 2004).*
International Search Report dated Jul. 7, 2015, issued in counterpart International Application No. PCT/JP2015/002557 (2 pages).
English translation of Chinese Search Report dated Jun. 19, 2018, issued in counterpart Chinese Application No. 201580022245.7. (2 pages).

* cited by examiner (a)          (b)

(a)          (b)

ROLLED-TYPE BATTERY

This application is a Continuation of U.S. application Ser. No. 15/306,626 filed on Oct. 25, 2016, which is a national stage application filed under 35 USC § 371 of International Application No. PCT/JP2015/002557, filed May 21, 2015, and which is based upon and claims the benefit of priority from the prior Japanese Patent Application No. 2014-131555, filed on Jun. 26, 2014, the entire contents of which are incorporated herein by reference.

TECHNICAL FIELD

The present invention relates to wound batteries.

BACKGROUND ART

In recent years, portable devices have become markedly sophisticated. The power supplies for such portable devices are desired to be small and have a high capacity. However, the smaller the size, the more difficult it is to produce batteries with a high capacity. To overcome this difficulty, development is underway on tube-shaped wound batteries used as the power supplies for portable devices. For example, an advantage of cylindrical batteries over prismatic batteries is that it is easy to increase the capacity and to reduce the size of the batteries.

Patent Literature 1 teaches a battery including a cylindrical bottomed metallic case with a small diameter and a sealing member that seals the open end of the case. The metallic case accommodates a wound electrode assembly. The electrode assembly includes first and second electrodes, a first current collector lead connected to the first electrode, and a second current collector lead connected to the second electrode. In a usual wound electrode assembly, two current collector leads extend in opposite directions with one of the leads being welded to the bottom of the metallic case. In Patent Literature 1, however, both the first current collector lead and the second current collector lead are directed toward the open end of the metallic case because the fact that the diameter of the metallic case is small makes it difficult to weld the current collector lead to the bottom of the metallic case.

CITATION LIST

Patent Literature

PTL 1: International Publication No. 2012/111061

SUMMARY OF INVENTION

Technical Problem

A wound electrode assembly with a small diameter is susceptible to a strain caused by a current collector lead. Such a strain gives rise to a local change in pressure inside the electrode assembly. If a first current collector lead and a second current collector lead extend in the same direction as is the case in Patent Literature 1, there is a high risk that an internal short circuit will be caused. Thus, there has been a demand for the development of wound batteries that have a small size and a high capacity and are resistant to the occurrence of internal short circuits.

Solution to Problem

An aspect of the present invention resides in a wound battery including a generator element and a battery case accommodating the generator element, the generator element including a first electrode, a second electrode having a different polarity from the first electrode, a separator disposed between the first electrode and the second electrode, and an electrolyte. The first electrode and the second electrode are wound together via the separator to form an electrode assembly. The battery case includes a bottomed tube-shaped metallic can and a sealing member that seals the open end of the metallic can. The first electrode includes a first current collector sheet and a first active material layer disposed on a surface of the first current collector sheet, and has a first uncoated region defined by an exposed portion of the first current collector sheet at an end of the first current collector sheet in the axial direction of winding. The first electrode includes a first current collector lead connected to the first uncoated region. The first uncoated region is disposed on the same side in the battery case as the open end of the metallic can. The second electrode includes a second current collector sheet and a second active material layer disposed on a surface of the second current collector sheet. The second electrode includes a second current collector lead connected thereto. The first current collector lead and the second current collector lead each extend toward the open end of the metallic can. At least a portion of the first uncoated region is covered with an insulating layer, and the insulating layer extends beyond an end face of the first uncoated region.

Advantageous Effects of Invention

The wound batteries according to the present invention have a small size and a high capacity and are resistant to the occurrence of internal short circuits.

DESCRIPTION OF EMBODIMENTS

Figure 1:
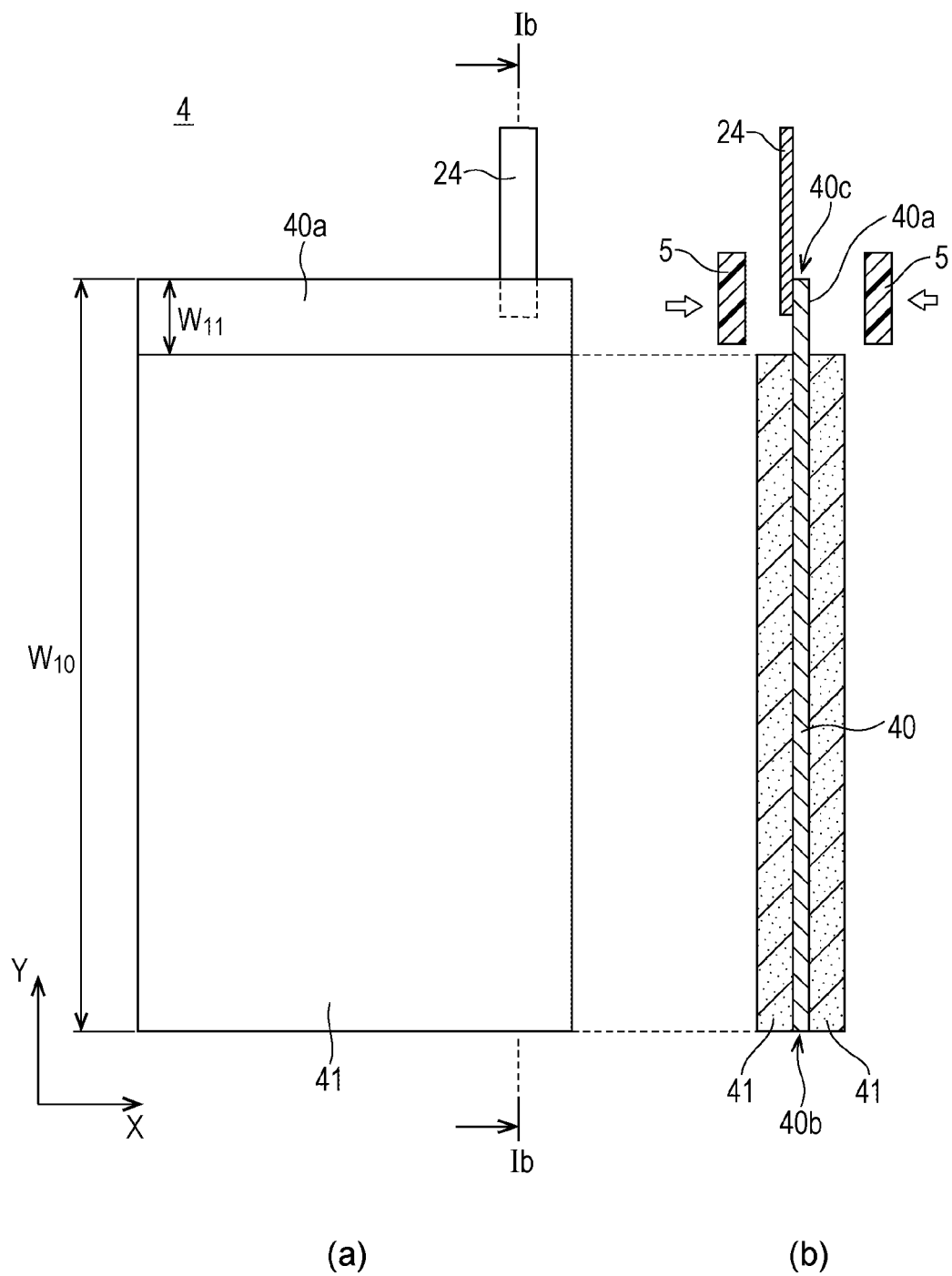
FIG. 1 is a set of views illustrating a first electrode fitted with a first current collector lead wherein (a) is a plan view schematically illustrating the first electrode before a first uncoated region is covered with insulating layers, and (b) is a sectional view (b) taken along line Ib-Ib.

A wound battery according to the invention includes a generator element and a battery case accommodating the generator element. The generator element includes a first electrode, a second electrode having a different polarity from the first electrode, a separator disposed between the first electrode and the second electrode, and an electrolyte. The first electrode and the second electrode are wound together via the separator to form a wound electrode assembly. The battery case, in which the generator element is accommodated, includes a bottomed tube-shaped metallic can and a sealing member that seals the open end of the metallic can.

The first electrode includes a first current collector sheet and a first active material layer disposed on a surface of the first current collector sheet. A portion of the first current collector sheet is exposed at an end of the first current collector sheet in the axial direction of winding, thus defining a first uncoated region. The first uncoated region is preferably disposed in the form of a strip extending along the end. The first electrode includes a first current collector lead connected to the first uncoated region, and the first uncoated region is disposed on the same side in the battery case as the open end of the metallic can. This configuration eliminates the need of providing an uncoated region at an end of the first current collector sheet in the direction perpendicular to the winding axial direction, and thus makes it possible to avoid an unnecessary increase in the diameter of the electrode assembly. That is, the above configuration is advantageous for increasing the capacity.

In the following description, the axial direction of winding of the electrode assembly will be referred to as the "first direction", and the direction perpendicular to the winding axial direction will be written as the "second direction".

The second electrode includes a second current collector sheet and a second active material layer disposed on a surface of the second current collector sheet. The second electrode includes a second current collector lead connected thereto. The first current collector lead and the second current collector lead each extend toward the open end of the metallic can. The first electrode is connected to, for example, the sealing member that is conductive, via the first current collector lead. The second electrode is connected to, for example, the metallic can via the second current collector lead. By virtue of the configuration that causes the second current collector lead to extend toward the open end of the metallic can, the second current collector lead can be easily welded to the metallic can even in the case where the diameter of the metallic can is small.

In the above configuration, the first uncoated region, the first current collector lead and the second current collector lead are all disposed on the same side as the open end of the metallic can. Here, at least a portion of the first uncoated region is covered with an insulating layer to reduce the risk that the first uncoated region will contact with the second electrode and/or the second current collector lead. Further, the insulating layer also prevents a contact between the first uncoated region and the metallic can.

The insulating layer extends beyond the end face of the first uncoated region toward the direction in which the first current collector lead extends. This configuration reduces the risk that the end face (edge) of the first uncoated region will cause internal short circuits. Further, the insulating layer fixes the root of the first current collector lead (the portion near the end face of the first uncoated region) so that the first current collector lead is restrained from moving. Consequently, the first current collector lead is directed straight in the upward direction and the risk of internal short circuits is further reduced.

The purpose of fixing the root of the first current collector lead does not necessarily require that the entirety of the first uncoated region be covered with the insulating layer. It is, however, preferable that at least a portion of the first uncoated region that is overlapped by the first current collector lead be covered with the insulating layer. It is also preferable that not less than 90% of the first uncoated region be covered with the insulating layer. The risk of internal short circuits is more effectively reduced by covering not less than 90% of the total area of the first uncoated region on both sides with the insulating layer.

It is preferable that the end face of the separator on the same side as the open end of the metallic can protrude beyond the end face of the first uncoated region. With this configuration, the risk of internal short circuits can be further reduced. It is also preferable that the end face of the first uncoated region protrude beyond the end face of the second current collector sheet. This configuration makes it possible to establish a strong connection between the first uncoated region and the first current collector lead.

Both ends of the second current collector sheet in the first direction (namely, the two ends disposed on the bottom and open sides of the metallic can) are preferably aligned with both ends of the second active material layer in the first direction. That is, it is preferable that the second active material layers be disposed on both sides to extend to the two ends in the first direction. This configuration allows the second active material layers to be opposed to the first active material layers over a sufficiently large area, and can also significantly reduce the risk of internal short circuits due to contact between the second current collector sheet and the first uncoated region.

It is not necessary that the second active material layer cover each of the ends to its end face (edge). It is not necessary that the second active material layer cover each end over its entire length. For example, the second active material layer suitably covers not less than 50% of the length of each end.

Preferably, a second uncoated region defined by an exposed portion of the second current collector sheet is disposed at one end of the second current collector sheet in the second direction. The second uncoated region is preferably disposed in the form of a strip extending along the one end. With this configuration, the second current collector lead can be firmly weld-connected to the second uncoated region. The other end of the second current collector sheet in the second direction may be aligned with the end of the second active material layer or may define an uncoated region in which the second current collector sheet is exposed. Such an additional uncoated region is preferably disposed in the form of a strip extending along the other end.

Preferably, both ends of the first current collector sheet in the second direction are aligned with both ends of the first active material layer in the second direction. That is, it is preferable that the first active material layers be disposed on both sides to extend to the two ends in the second direction. This configuration allows the first active material layers to be opposed to the second active material layers over a sufficiently large area. Here, it is not necessary that the first active material layer cover each of the ends to its end face (edge). The first active material layer suitably covers not less than 50% of the length of each end.

The insulating layer is preferably an insulating tape which has an insulating sheet and a self-adhesive layer disposed on one side of the insulating sheet. The use of such an insulating tape facilitates the operation to cover the first uncoated region with the insulating layer and thus makes it possible to reduce production costs. The insulating tape may be used in such a manner that the insulating tape sandwiches the first uncoated region from the front and back sides while covering the end face of the first uncoated region.

The metallic can may be, for example, a cylinder having a diameter (an outer diameter of a cross section perpendicular to the direction of the axis of the metallic can) of not more than 10 mm or not more than 6 mm. To ensure strength, the metallic can is preferably made of stainless steel, and the wall of the can preferably has a thickness of 0.05 mm to 0.2 mm. This configuration realizes a preferred embodiment in which the wound battery attains a high strength in addition to a small size and a high capacity. Difficulties are encountered in reducing the diameter of the cylindrical metallic can to below 1 mm. Thus, the diameter is preferably not less than 1 mm.

Hereinbelow, embodiments of the invention will be described in detail based on the drawings assuming that the first electrode is a positive electrode and the second electrode is a negative electrode as an example. In the drawings, constituents having substantially identical functions will be indicated with the same reference signs for the purpose of simplicity of the explanation.

(Positive Electrodes)

As illustrated in FIG. 1, a positive electrode 4 includes a positive electrode current collector sheet 40 as a first current collector sheet, and positive electrode active material layers 41 disposed on both sides of the positive electrode current collector sheet 40. The positive electrode current collector sheet 40 is a rectangular sheet and, in the present embodiment, the direction in which the longer side extends (direction Y in FIG. 1) is the first direction (the winding axial direction). The positive electrode current collector sheet 40 is exposed at one end in the first direction (hereinafter, the first end) and thus defines a first uncoated region 40a. The first uncoated region 40a is disposed as a strip extending along the first end. An end of a rectangular positive electrode current collector lead 24 is weld-connected to the first uncoated region 40a.

The positive electrode current collector sheet is not exposed at the other end in the first direction (hereinafter, the second end), and the positive electrode active material layers 41 are disposed on the entirety of both sides except the end face 40b of the second end. Further, the entirety of both sides of the two ends of the positive electrode current collector sheet 40 in the second direction (direction X in FIG. 1) are covered with the positive electrode active material layers 41 except the end faces thereof and portions that are portions of the first uncoated region. The positive electrode having such a structure may be produced easily by applying a mixture of raw materials of the positive electrode active material layers 41 in the form of stripes onto a large sheet as a raw material of the positive electrode current collector sheet 40 and thereafter cutting the thus-formed raw electrode plate to a prescribed shape.

The term "end face" indicates a cross section in the thickness direction that is exposed as a result of cutting of the current collector sheet.

The width $W_{10}$ of the positive electrode current collector sheet 40 in the first direction may be selected appropriately in accordance with the length of the metallic can or the battery capacity. The width $W_{11}$ of the first uncoated region 40a is preferably 2 mm to 4 mm. This range of the width $W_{11}$ ensures that the positive electrode active material layers 41 can be formed over a sufficiently large area relative to the surface of the positive electrode current collector sheet 40, and also makes it easy to ensure the strength at the joint with the positive electrode current collector lead 24.

Figure 2:
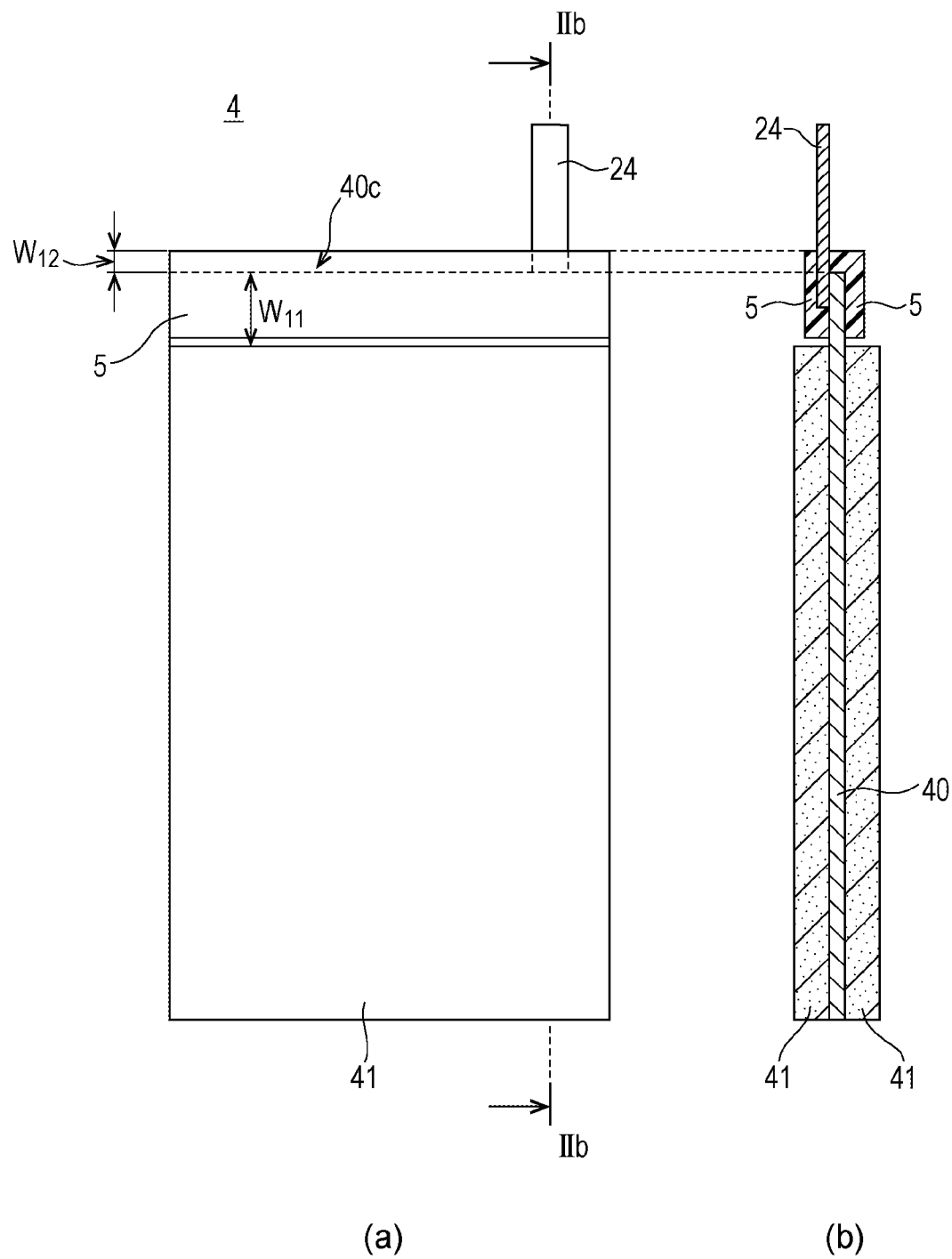
FIG. 2 is a set of views illustrating a first electrode fitted with a first current collector lead wherein (a) is a plan view schematically illustrating the first electrode after a first uncoated region is covered with insulating layers, and (b) is a sectional view (b) taken along line IIb-IIb.

FIG. 1 schematically illustrates the electrode before the first uncoated region 40a of the positive electrode current collector sheet 40 is covered with insulating layers 5, whilst FIG. 2 schematically illustrates the electrode after the first uncoated region 40a is covered with the insulating layers 5 applied from the front and back sides. The insulating layers 5 are provided in the form of a strip that extends along the first end so as to cover the end face 40c of the first end. As a result, the portion of the first uncoated region 40a that is overlapped by the positive electrode current collector lead 24 is covered with the insulating layers 5. Because the insulating layers 5 are disposed to cover the end face 40c of the first end, the insulating layers 5 extend slightly beyond the end face 40c of the first end. This configuration reduces the risk that internal short circuits will be caused by the presence of the first uncoated region 40a, and also ensures that the root of the positive electrode current collector lead 24 is fixed by the insulating layers 5 and the movement of the positive electrode current collector lead 24 is restrained, resulting in the reduction of the risk of internal short circuits caused by the positive electrode current collector lead 24.

The extension width $W_{12}$ of the portion of the insulating layers 5 beyond the end face 40c of the first end is preferably 0.1 m to 1 mm, and more preferably 0.4 mm to 0.6 mm. This width ensures that the insulating layers 5 will fix the root of the positive electrode current collector lead 24 more effectively and an unnecessary increase in the length of the electrode assembly in the first direction will be avoided.

While FIG. 2 illustrates the first uncoated region 40a as being incompletely covered with the insulating layers 5, it is preferable that not less than 90% of the total area of both sides of the first uncoated region 40a be covered with the insulating layers 5, and it is more preferable that the first uncoated region 40a be completely covered with the insulating layers 5.

The insulating layers 5 may be formed of an insulating material. A preferred insulating material is a pressure-sensitive adhesive including an insulating resin component, with examples including rubber pressure-sensitive adhesives, acrylic pressure-sensitive adhesives, silicone pressure-sensitive adhesives and urethane pressure-sensitive adhesives. Where necessary, the pressure-sensitive adhesive includes additional components such as a tackifier, a cross-linking agent, a softener and an antiaging agent in addition to the resin component. A rubber pressure-sensitive adhesive includes a rubber component such as natural rubber, butyl rubber or isoprene rubber. An acrylic pressure-sensitive adhesive includes a polymer of an acrylic monomer such as acrylonitrile, (meth)acrylic acid or (meth)acrylate ester. A silicone pressure-sensitive adhesive includes polysiloxane or silicone rubber.

The insulating layers 5 may be an insulating tape. The use of an insulating tape facilitates the operation to cover the first uncoated region 40a with the insulating layers. The insulating tape has an insulating sheet (a base film) and a self-adhesive layer disposed on one side of the insulating sheet. The self-adhesive layer includes the pressure-sensitive adhesive described above.

The insulating sheet may be a film of a polyolefin or an engineering plastic, with examples including polypropylene films, polyethylene terephthalate films, polyimide films and polyphenylene sulfide (PPS) films. In particular, a polypropylene film with a thickness of 20 μm to 60 μm is preferably used because the strain produced by such a film has little influence on the electrode assembly.

The thickness of the insulating layer 5 is preferably not more than the thickness of the positive electrode active material layer, and is more preferably 20% to 50% of the thickness of the positive electrode active material layer. By virtue of such a thickness of the insulating layers 5 disposed on the first uncoated region, the insulating layers 5 cause little strain that affects the electrode assembly even when the assembly is formed with a small diameter and consequently the electrode assembly is prevented from having a local change in inside pressure.

The positive electrode current collector sheet 40 is a porous or nonporous conductive substrate. In the case where the cylindrical battery is a lithium ion battery, the material of the positive electrode current collector sheet 40 that is suitably used is, for example, a metal foil such as aluminum or an aluminum alloy. The thickness of the positive electrode current collector sheet is not particularly limited but is preferably 10 μm to 20 μm.

The positive electrode active material layer 41 includes a positive electrode active material as an essential component and contains optional components such as a binder and a conductive agent. In the case of a lithium ion secondary battery, the positive electrode active material is preferably a lithium composite oxide such as, for example, $LiCoO_2$, $LiNiO_2$ or $LiMn_2O_4$. In the case of a lithium ion primary battery, the positive electrode active material may be manganese dioxide or graphite fluoride. For the formation of the positive electrode active material layers 41, a positive electrode slurry is prepared by mixing a positive electrode mixture including the positive electrode active material with a liquid component. Next, the positive electrode slurry is applied to the surfaces of the positive electrode current collector sheet and the coatings are dried. Subsequently, the dried films are rolled together with the positive electrode current collector sheet to form positive electrode active material layers having a prescribed thickness. The thickness of the positive electrode active material layer is not particularly limited but is preferably 70 μm to 130 μm.

In the case of lithium ion batteries, preferred examples of the materials of the positive electrode current collector leads 24 include aluminum, aluminum alloys, nickel, nickel alloys, iron and stainless steel. The thickness of the positive electrode current collector lead 24 is preferably 10 μm to 120 μm, and more preferably 20 μm to 80 μm. The shape of the positive electrode current collector lead 22 is not particularly limited. When the metallic can is a cylinder having a diameter of not more than 10 mm, the lead is, for example, a rectangular lead having a width of 0.5 mm to 3 mm and a length of 3 mm to 10 mm.

(Negative Electrodes)

Figure 3:
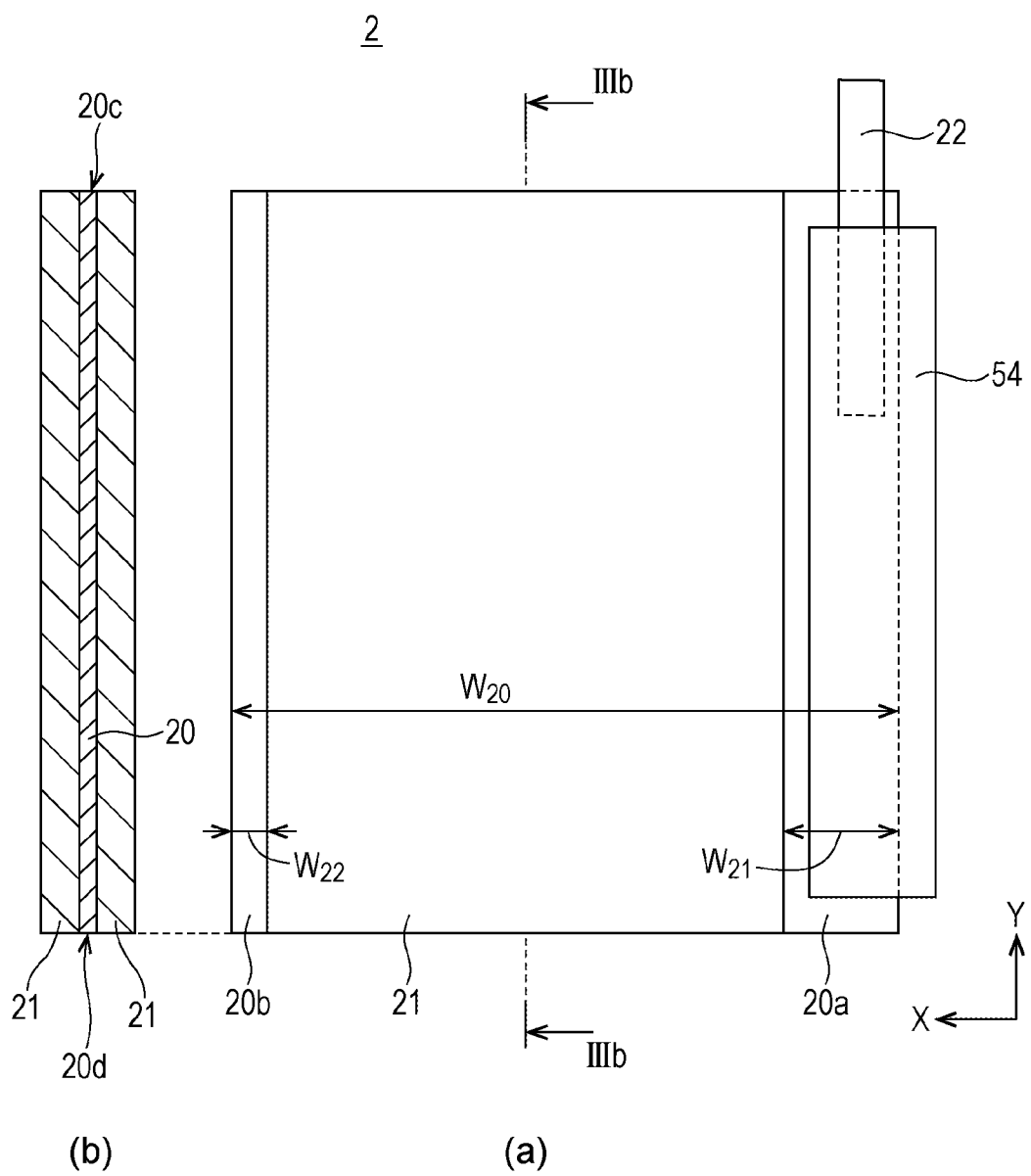
FIG. 3 is a set of views illustrating a second electrode fitted with a second current collector lead wherein (a) is a schematic plan view and (b) is a sectional view taken along line IIIb-IIIb.

As illustrated in FIG. 3, the negative electrode 2 includes a negative electrode current collector sheet 20 as a second current collector sheet, and negative electrode active material layers 21 disposed on both sides of the negative electrode current collector sheet 20. The negative electrode current collector sheet 20 is a rectangular sheet whose length in the second direction is designed to be greater than the positive electrode current collector sheet 40. At an end of the negative electrode current collector sheet 20 in the second direction (direction X in FIG. 3) (hereinafter, the first end), a relatively wide portion of the negative electrode current collector sheet is exposed to define a second uncoated region (A) 20a. The second uncoated region (A) 20a is disposed in the form of a strip extending along the first end. An end of a rectangular negative electrode current collector lead 22 is weld-connected to the second uncoated region (A) 20a.

The negative electrode current collector sheet 20 is also exposed at the other end of the negative electrode current collector sheet 20 in the second direction (hereinafter, the second end) to define a second uncoated region (B) 20b in the form of a strip. Such an exposed portion of the negative electrode current collector sheet 20 is disposed to prevent the separation of the negative electrode active material layers.

Both ends of the negative electrode current collector sheet 20 in the first direction (direction Y in FIG. 3) are covered with the negative electrode active material layers 21 except the end faces 20c and 20d of the respective ends and portions that are portions of the second uncoated regions 20a and 20b. This configuration allows the negative electrode active material layers 21 to be opposed to the positive electrode active material layers 41 over a sufficiently large area, and also significantly reduces the risk of internal short circuits due to contact between the first uncoated region 40a and the negative electrode current collector sheet 20.

The width $W_{21}$ of the second uncoated region (A) 20a is preferably 10% to 50% of the width $W_{20}$ of the negative electrode current collector sheet 20 in the second direction. This range of the width $W_{21}$ ensures that the negative electrode active material layers 21 can be formed over a sufficiently large area relative to the surface of the negative electrode current collector sheet 20, and also makes it easy to ensure the strength at the joint with the negative electrode current collector lead 22. The width $W_{22}$ of the second uncoated region (B) 20b is suitably 1% to 10% of the width $W_{20}$. The second uncoated region (B) 20b may be omitted. The negative electrode active material layer may extend to at least portions of the backsides of the second uncoated regions 20a and 20b. Alternatively, the backsides of the second uncoated regions 20a and 20b may define uncoated regions in which the negative electrode current collector sheet is exposed similarly to the front side.

The negative electrode current collector sheet 20 is a porous or nonporous conductive substrate. In the case where the cylindrical battery is a lithium ion battery, the material of the negative electrode current collector sheet that is suitably used is, for example, a metal foil such as stainless steel, nickel, copper, an copper alloy or aluminum. The thickness of the negative electrode current collector sheet is not particularly limited but is preferably 5 μm to 20 μm.

The negative electrode active material layer 21 includes a negative electrode active material as an essential component and contains optional components such as a binder and a conductive agent. In the case of a lithium ion battery, the negative electrode active material may be metallic lithium, an alloy (such as silicon alloy or tin alloy), a carbon material (such as graphite or hard carbon), a silicon compound, a tin compound or a lithium titanium oxide compound. For the formation of the negative electrode active material layers 21, a negative electrode slurry is prepared by mixing a negative electrode mixture including the negative electrode active material with a liquid component. Next, the negative electrode slurry is applied to the surfaces of the negative electrode current collector sheet and the coatings are dried. Subsequently, the dried films are rolled together with the negative electrode current collector sheet to form negative electrode active material layers having a prescribed thickness. The thickness of the negative electrode active material layer is not particularly limited but is preferably 70 μm to 150 μm. When the negative electrode active material is an alloy or a compound, the active material layers may be formed by a vacuum process.

In the case of lithium ion batteries, preferred examples of the materials of the negative electrode current collector leads 22 include nickel, nickel alloys, iron, stainless steel, copper and copper alloys. The thickness of the negative electrode current collector lead 22 is preferably 10 μm to 120 μm, and more preferably 20 μm to 80 μm. The shape of the negative electrode current collector lead 22 is not particularly limited. When the metallic can is a cylinder having a diameter of not more than 10 mm, the lead is, for example, a rectangular lead having a width of 0.5 mm to 3 mm and a length of 9 mm to 15 mm.

Examples of the binders which may be used in the positive electrode active material layers and/or the negative electrode active material layers include fluororesins (such as polyvinylidene fluoride and polytetrafluoroethylene), polyamides, polyimides, polyamidimides, polyacrylic acids and styrene butadiene rubbers. Examples of the conductive agents which may be used in the positive electrode active material layers and/or the negative electrode active material layers include graphites, carbon blacks and carbon fibers.

FIG. 3 schematically illustrates the electrode in which the negative electrode current collector lead 22 has been connected to the second uncoated region (A) 20a and an insulating fixer tape 54 has been applied thereon. The insulating fixer tape 54 serves to fix the outermost periphery of the electrode assembly after the winding of the electrode assembly, and also covers part of the overlap between the negative electrode current collector lead 22 and the second uncoated region (A) 20a. With this configuration, the strength at the joint between the negative electrode current collector lead 22 and the negative electrode current collector sheet 20 is easily ensured.

Figure 4:
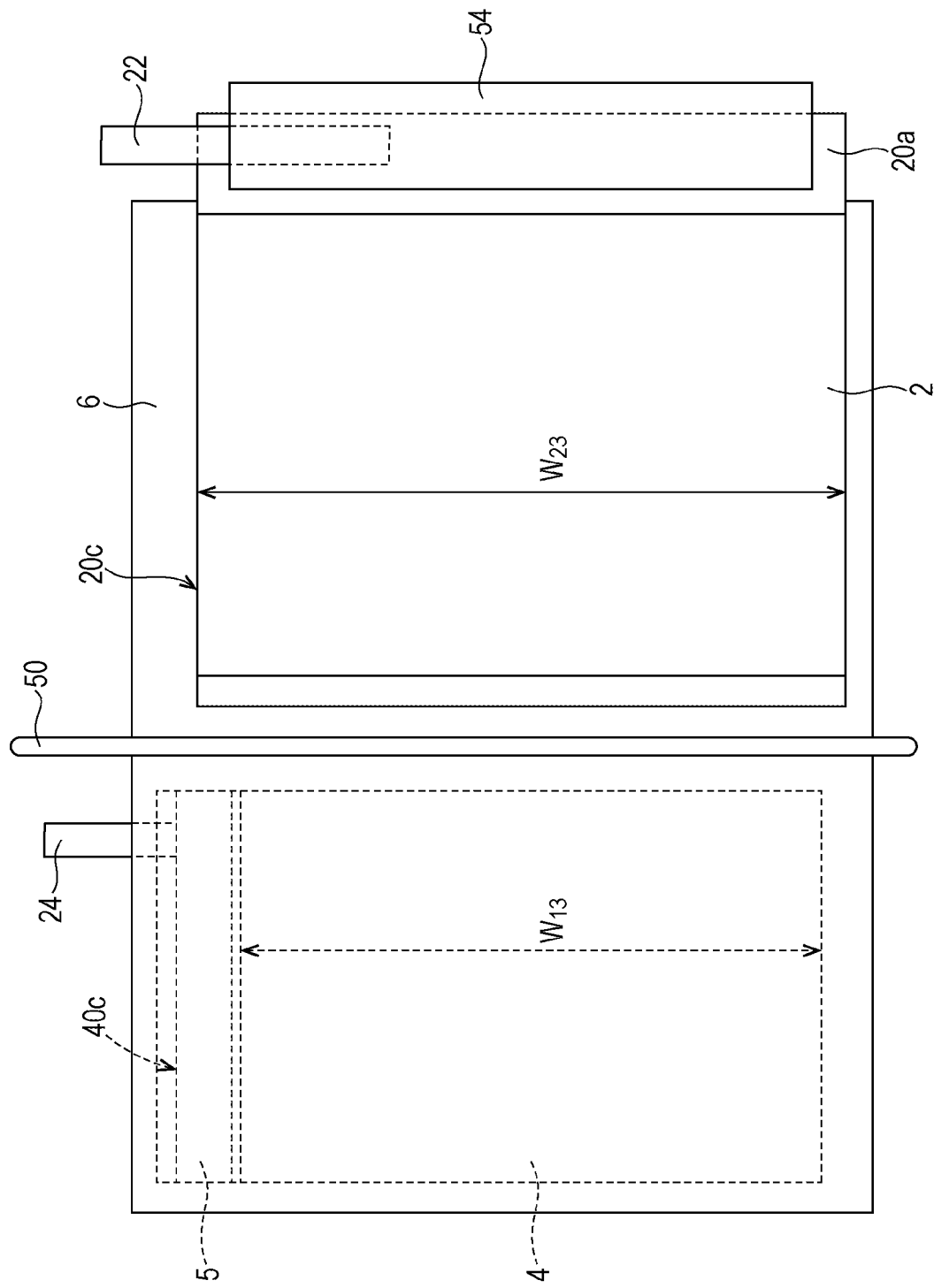
FIG. 4 is a plan view schematically illustrating a configuration of an electrode assembly before its winding.

FIG. 4 is a plan view schematically illustrating a configuration of the electrode assembly before its winding.

In the illustrated example, the separator 6 is disposed in the middle, and the positive electrode 4 is disposed on the left side of the backside of the separator 6 while the negative electrode 2 is disposed on the right side of the front side of the separator 6. The width $W_{13}$ of the positive electrode active material layer 41 in the winding axial direction (the first direction) is slightly smaller than the width $W_{23}$ of the negative electrode active material layer 21 in the first direction, and the positive electrode 4 and the negative electrode 2 are stacked so that the positive electrode active material layers 41 will completely overlap with the negative electrode active material layers 21. Such a stack of the positive electrode 4, the separator 6 and the negative electrode 2 is wound around a core 50 to form an electrode assembly.

Both ends of the separator 6 in the first direction protrude beyond the corresponding ends of the positive electrode 4 and the negative electrode 2, and thereby the risk of internal short circuits is further reduced. Further, the end face 40c of the first uncoated region 40a protrudes beyond the end face 20c of the negative electrode current collector sheet 20. This configuration ensures a region for the connection between the first uncoated region 40a and the positive electrode current collector lead 24, and thus realizes a strong connection. Further, the above positional relationship causes the end face of the negative electrode current collector sheet to be opposed to the insulating layer 5 covering the first uncoated region 40a, thus realizing a significant decrease in the risk of internal short circuits caused by the end face of the negative electrode current collector sheet.

One end of the negative electrode 2 in the second direction (the second uncoated region 20a) extends beyond the separator 6. The extended portion will be opposed to the inner sidewall of the metallic can.

Figure 5:
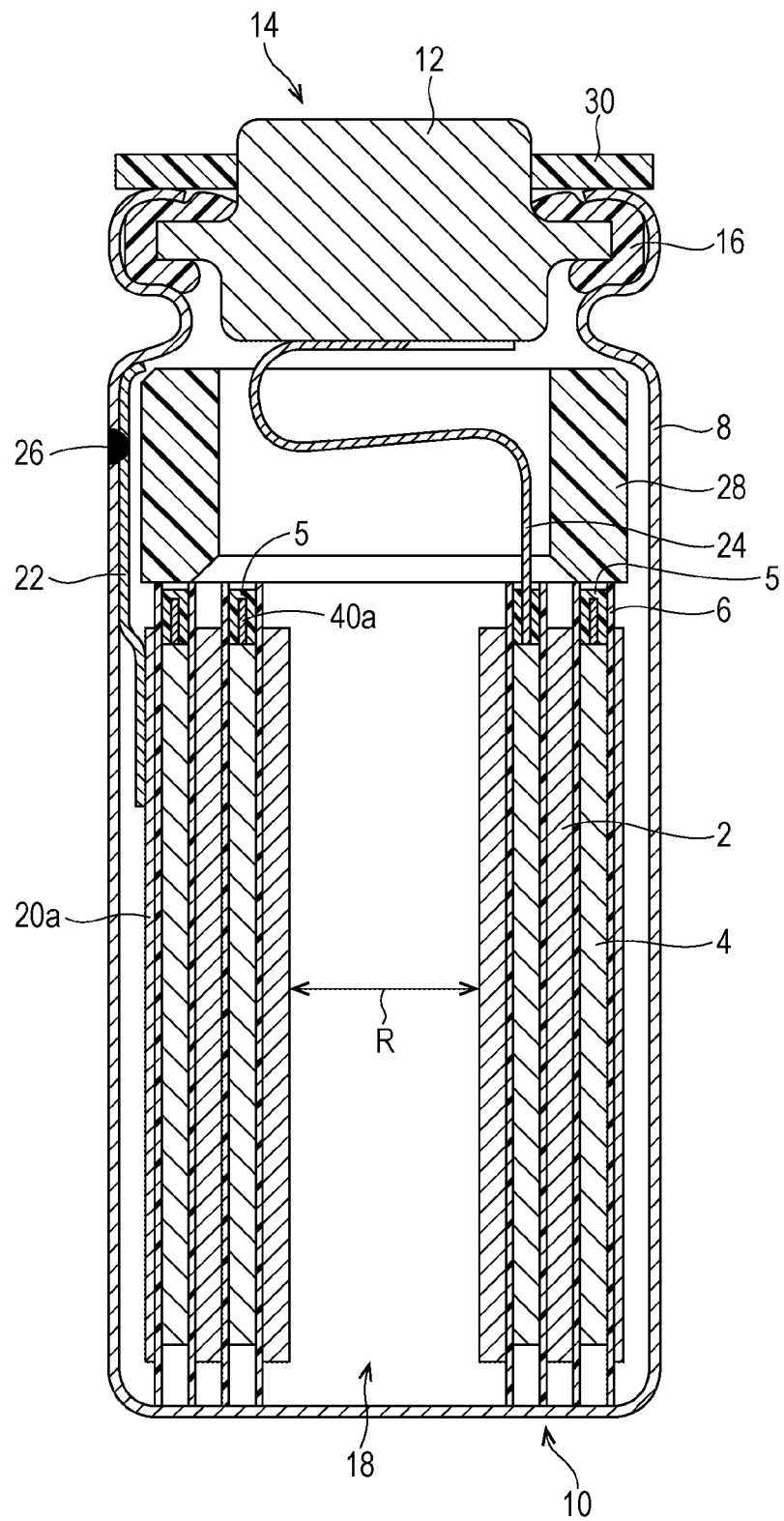
FIG. 5 is a vertical sectional view of a cylindrical battery according to an embodiment of the invention.

FIG. 5 is a vertical sectional view of a cylindrical battery according to an embodiment of the invention.

The generator element of the cylindrical battery includes a positive electrode 4 as a first electrode, a negative electrode 2 as a second electrode, a separator 6 disposed between the first electrode and the second electrode, and an electrolyte (not shown). The positive electrode 4 and the negative electrode 2 are wound together via the separator 6 to form a wound electrode assembly. The battery case includes a bottomed cylindrical metallic can 8, and a sealing member 12 that seals the open end of the metallic can 8. The winding axis of the electrode assembly coincides with the central axis of the metallic can 8, and the vicinity of the winding axis is a hollow 18 (diameter R) free from the generator element.

The hollow with a diameter R is formed in the center of the electrode assembly as a result of the removal of a core 50 after the winding of the stack into the electrode assembly. The electrode assembly is then inserted into the metallic can 8. In this process, a negative electrode current collector lead 22 and a positive electrode current collector lead 24 are arranged on the same side as the open end of the metallic can 8. Thereafter, the negative electrode current collector lead 22 present on the outer peripheral side of the electrode assembly is brought into contact with the inner sidewall of the metallic can 8, and the negative electrode current collector lead 22 is welded to the metallic can 8 by spot welding. Further, an insulating intermediate member 28 in the form of a ring is placed on the electrode assembly, and thereafter the positive electrode current collector lead 24 is welded to the lower surface of the sealing member 12. Subsequently, the electrolyte is injected into the metallic can 8 by a vacuum method. Lastly, the open end of the metallic can 8 is crimped together with the sealing member 12 via an insulating member (a gasket) 16, thus forming a cylindrical battery. An insulating ring member 30 is arranged on the circumference of the portion of the sealing member 12 that protrudes beyond the metallic can 8 to the outside, and thereby insulates the metallic can 8 and the sealing member 12 from each other.

If the curvature radius of the start of the coil is excessively small, there is a risk that the active material layers may be separated from the current collector sheets. It is therefore necessary that the diameter of the core 50 be not excessively small. If, on the other hand, the diameter of the core 50 is too large, the battery capacity is decreased. The core 50 is preferably selected so that the diameter of the hollow inside the electrode assembly will be not more than 3 mm, or preferably less than 1.5 mm. The core may be left in the battery without being removed.

One end of the negative electrode current collector lead 22 is electrically connected to the exposed portion (the second uncoated region (A) 20a) of the negative electrode current collector sheet in the negative electrode 2. The other end of the negative electrode current collector lead 22 extends toward the open end of the metallic can 8 and is welded to a welding point 26 on the inner sidewall near the open end of the metallic can 8 which also serves as a negative electrode terminal 10.

One end of the positive electrode current collector lead 24 is electrically connected to the exposed portion (the first uncoated region 40a) of the positive electrode current collector sheet in the positive electrode 4. Similarly as described above, the other end of the positive electrode current collector lead 24 extends toward the open end of the metallic can 8 and is electrically connected to the sealing member 12 which also serves as a positive electrode terminal 14.

To ensure a sufficient area for the connection with the positive electrode current collector lead 24, the end face of the first uncoated region 40a of the positive electrode current collector sheet 40 protrudes beyond the end face of the negative electrode current collector sheet 20 toward the open end of the metallic can 8. At the same time, substantially the entirety of the first uncoated region 40a of the positive electrode current collector sheet 40 including the end face thereof is covered with insulating layers 5. Consequently, the first uncoated region 40a is prevented from contact with, for example, the negative electrode current collector lead 22. Further, the end face of the separator 6 protrudes beyond the end face of the first uncoated region 40a toward the open end of the metallic can 8 and consequently the probability of any contact between the first uncoated region 40a and the negative electrode members is further reduced.

(Separators)

Examples of the separator 6 disposed between the positive electrode 4 and the negative electrode 2 include insulating microporous thin films, woven fabrics and nonwoven fabrics. In the case of lithium ion batteries, preferred examples of the separator materials include polyolefins such as polypropylene and polyethylene. Polyolefins are advantageous because of their excellent durability and shutdown function. For example, the thickness of the separator 6 is 10 μm to 300 μm, preferably 10 μm to 40 μm, and more preferably 10 μm to 25 μm. The microporous thin film may be a monolayer film or a multilayer film. The porosity of the separator is preferably 30% to 70%, and more preferably 35% to 60%.

(Nonaqueous Electrolytes)

The nonaqueous electrolyte may be a liquid, a gel or a solid. A liquid nonaqueous electrolyte used in lithium ion batteries is usually composed of a lithium salt and a nonaqueous solvent in which the lithium salt is dissolved. The nonaqueous solvents are not particularly limited, and examples include cyclic carbonate esters, chain carbonate esters and cyclic carboxylate esters. Examples of the cyclic carbonate esters include propylene carbonate and ethylene carbonate. Examples of the chain carbonate esters include diethyl carbonate, ethyl methyl carbonate and dimethyl carbonate. Examples of the cyclic carboxylate esters include y-butyrolactone and y-valerolactone. Examples of the lithium salts include $LiPF_6$ and $LiBF_4$.

The embodiments of the invention discussed above are only illustrative, and the scope of the invention is not limited to the above embodiments. The present invention is suitably applied to various types of nonaqueous electrolyte batteries represented by lithium ion batteries. The batteries may be primary batteries or secondary batteries. The shape of the batteries may be any tube-like shape such as cylindrical or elliptical. The size of the batteries is not limited. The application of the present invention attains a high technical significance when the metallic can is a cylinder having a diameter of not more than 10 mm or not more than 6 mm. A particularly preferred embodiment of the invention can be realized when the metallic can is made of stainless steel and has a wall thickness of 0.05 mm to 0.2 mm.

INDUSTRIAL APPLICABILITY

The present invention is applicable to wound batteries, and is particularly useful for the production of compact and high-capacity cylindrical batteries.

REFERENCE SIGNS LIST

2: NEGATIVE ELECTRODE (SECOND ELECTRODE)
4: POSITIVE ELECTRODE (FIRST ELECTRODE)
5: INSULATING LAYER
6: SEPARATOR
8: METALLIC CAN
10: NEGATIVE ELECTRODE TERMINAL
12: SEALING MEMBER
14: POSITIVE ELECTRODE TERMINAL
16: INSULATING MEMBER
18: HOLLOW
20: NEGATIVE ELECTRODE CURRENT COLLECTOR SHEET (SECOND CURRENT COLLECTOR)
20a: SECOND UNCOATED REGION (A)
20b: SECOND UNCOATED REGION (B)
21: NEGATIVE ELECTRODE ACTIVE MATERIAL LAYER (SECOND ACTIVE MATERIAL LAYER)
22: NEGATIVE ELECTRODE CURRENT COLLECTOR LEAD (SECOND CURRENT COLLECTOR LEAD)
24: POSITIVE ELECTRODE CURRENT COLLECTOR LEAD (FIRST CURRENT COLLECTOR LEAD)
26: WELDING POINT
28: INTERMEDIATE MEMBER
30: RING MEMBER
40: POSITIVE ELECTRODE CURRENT COLLECTOR SHEET (FIRST CURRENT COLLECTOR SHEET)
41: POSITIVE ELECTRODE ACTIVE MATERIAL LAYER (FIRST ACTIVE MATERIAL LAYER)
40a: FIRST UNCOATED REGION
50: CORE
54: INSULATING FIXER TAPE

The invention claimed is:

1. A wound battery comprising:
a generator element, and
a battery case accommodating the generator element,
the generator element including a first electrode, a second electrode having a different polarity from the first electrode, a separator disposed between the first electrode and the second electrode, and an electrolyte, the first electrode and the second electrode being wound together via the separator to form an electrode assembly,
the battery case including a bottomed tube-shaped metallic can and a sealing member that seals an open end of the metallic can,
the first electrode including a first current collector sheet and a first active material layer disposed on a surface of the first current collector sheet, the first electrode having a first uncoated region defined by an exposed portion of the first current collector sheet at an end of the first current collector sheet in an axial direction of winding, the first electrode including a first current collector lead connected to the first uncoated region, the first uncoated region being disposed closer to the open end of the metallic can than the first active material layer in the battery case in the axial direction of winding,
the second electrode including a second current collector sheet and a second active material layer disposed on a surface of the second current collector sheet, the second electrode including a second current collector lead connected thereto,
the first current collector lead and the second current collector lead each extending toward the open end of the metallic can,
at least a portion of the first uncoated region being covered with an insulating layer which is longer in a direction perpendicular to the axial direction of winding than in the axial direction of winding,
the insulating layer extending beyond an end face of the first uncoated region in the axial direction of winding,
the insulating layer is separated from the first active material layer,
the insulating layer is covering a root of the first collector lead and all of the surface of the end face of the first uncoated region, and
the root of the first current collector lead is a portion near the end face of the first uncoated region.

2. The wound battery according to claim 1, wherein
on the same side as the open end of the metallic can, an end face of the separator protrudes beyond the end face of the first uncoated region,
the end face of the first uncoated region protrudes beyond an end face of the second current collector sheet, and
the end face of the second current collector sheet and the insulating layer are facing each other.

3. The wound battery according to claim 1, wherein both ends of the second current collector sheet in the axial direction of winding are aligned with both ends of the second active material layer in the axial direction of winding.

4. The wound battery according to claim 1, wherein the battery includes a second uncoated region defined by an exposed portion of the second current collector sheet at one end of the second current collector sheet in a direction perpendicular to the axial direction of winding, and the second current collector lead is connected to the second uncoated region.

5. The wound battery according to claim 1, wherein both ends of the first current collector sheet in a direction perpendicular to the axial direction of winding are aligned with both ends of the first active material layer in the direction perpendicular to the axial direction of winding.

6. The wound battery according to claim 1, wherein not less than 90% of the first uncoated region is covered with the insulating layer.

7. The wound battery according to claim 1, wherein
the insulating layer is an insulating tape having an insulating sheet and a self-adhesive layer disposed on one side of the insulating sheet, and
the insulating tape sandwiches the first uncoated region from the front and back sides while covering the end face of the first uncoated region.

8. The wound battery according to claim 1, wherein
the second current collector lead is brought into contact with an inner sidewall of the metallic can, and
the second current collector lead is welded to the metallic can.

9. The wound battery according to claim 1, wherein the first uncoated region is along an end portion of the first current collector sheet which is disposed in a strip extending in the axial direction of winding.

10. The wound battery according to claim 1, wherein both ends of the first uncoated region in the direction perpendicular to the axial direction of winding are aligned with both ends of the first current collector sheet in the direction perpendicular to the axial direction of winding.

11. The wound battery according to claim 1, wherein
the battery includes second uncoated regions defined by an exposed portion of the second current collector sheet at both ends of the second current collector sheet in a direction perpendicular to the axial direction of winding, and
the second current collector lead is connected to one of second uncoated regions.

12. The wound battery according to claim 1, wherein the first electrode, the insulating layer and the second electrode are wound together via the separator to form the electrode assembly.

13. The wound battery according to claim 1, wherein both ends of the insulating layer in the direction perpendicular to the axial direction of winding are aligned with both ends of the first uncoated region in the direction perpendicular to the axial direction of winding.

14. The wound battery according to claim 1, wherein the metallic can is a cylinder having a diameter of not more than 10 mm.

15. The wound battery according to claim 14, wherein the metallic can is made of stainless steel, and a wall of the can has a thickness of 0.05 mm to 0.2 mm.

* * * * *